(12) United States Patent
Jeon et al.

(10) Patent No.: US 8,632,929 B2
(45) Date of Patent: Jan. 21, 2014

(54) OXYGEN REDUCTION ELECTRODE AND FUEL CELL INCLUDING THE SAME

(75) Inventors: Woo-sung Jeon, Yongin-si (KR); Sang-Hyuk Suh, Yongin-si (KR); Suk-gi Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1269 days.

(21) Appl. No.: 11/641,436

(22) Filed: Dec. 18, 2006

(65) Prior Publication Data

US 2007/0196723 A1 Aug. 23, 2007

(30) Foreign Application Priority Data

Feb. 23, 2006 (KR) .................. 10-2006-0017874

(51) Int. Cl.
*H01M 4/90* (2006.01)
*H01M 4/92* (2006.01)

(52) U.S. Cl.
USPC ........... 429/532; 429/524; 429/525; 429/526; 429/527

(58) Field of Classification Search
USPC ..................................... 429/43, 44
See application file for complete search history.

(56) References Cited

U.S. PATENT DOCUMENTS

2004/0137283 A1* 7/2004 Leddy et al. .................... 429/10
2004/0137310 A1* 7/2004 Kiros .............................. 429/42

* cited by examiner

*Primary Examiner* — Barbara Gilliam
*Assistant Examiner* — Stephan Essex
(74) *Attorney, Agent, or Firm* — Christie, Parker & Hale, LLP

(57) ABSTRACT

An oxygen reduction electrode and a fuel cell including the same are provided. A catalyst layer of the oxygen reduction electrode includes a metalloporphyrin derivative as an additive. Accordingly, the oxygen reduction electrode can increase oxygen concentration and can easily form a triple phase boundary by reducing a flooding phenomenon caused by an electrolyte. A fuel cell including the same is also provided.

12 Claims, 6 Drawing Sheets

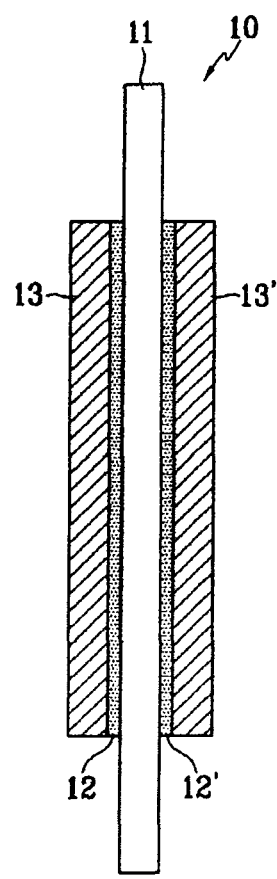

OXYGEN REDUCTION ELECTRODE AND FUEL CELL INCLUDING THE SAME

CROSS-REFERENCE TO RELATED PATENT APPLICATION

This application claims priority to and the benefit of Korean Patent Application No. 10-2006-0017874, filed on Feb. 23, 2006, in the Korean Intellectual Property Office, the disclosure of which is incorporated herein in its entirety by reference.

BACKGROUND OF THE INVENTION

1. Field of the Invention

The present invention relates to an oxygen reduction electrode and a fuel cell including the same.

2. Description of the Related Art

A fuel cell is an electrochemical device which directly transforms the chemical energy of hydrogen and oxygen which are contained in hydrocarbon materials such as methanol, ethanol, and natural gas into electrical energy. The energy transformation process of a fuel cell is very efficient and environmentally-friendly, thereby drawing attention for the past few years.

Fuel cells can be classified into Phosphoric Acid Fuel Cells (PAFCs), Molten Carbonate Fuel Cells (MCFCs), Solid Oxide Full Cells (SOFCs), Polymer Electrolyte Membrane Fuel Cells (PEMFCs), and Alkaline Full Cells (AFCs) according to the type of electrolyte used. All fuel cells operate on the same principle, but the type of fuel used, operating speed, the catalyst used and the electrolyte used are different. In particular, PEMFCs can be used in small-sized stationary power generation equipment or transportation systems due to their high reaction speed, low operating temperature, high output density, rapid start-up, and variation in requested output.

A fuel cell generally includes two electrodes, that is, a cathode and an anode, and a polymer electrolyte membrane. The cathode and the anode are generally each formed of a current collector, a gas diffusion layer, and a catalyst layer. A proton is dissociated from hydrogen or fuel, such as methanol, supplied to the anode ($H_2 \rightarrow 2H^+ + 2e$, E=0.000 V). Next, the proton is delivered to the cathode, which joins with oxygen to form water ($O_2 + 4H^+ + 4e \rightarrow 2H_2O$, E=1.229V). The cathode is also called an oxygen reduction electrode because an electric chemical reaction, where oxygen combines with the proton, is generated.

As described above, an oxygen reduction reaction generally follows a triple phase boundary reaction below on the surface of a catalyst.

In the oxygen reduction reaction, oxygen supplied in a gaseous state from the atmosphere transforms into liquid in a catalyst layer, and then reacts with a proton inside an electrolyte near the surface of a catalyst. Accordingly, the solubility of oxygen is an important factor in the operating temperature of a fuel cell, reaching about 150° C.

FIG. 1 is a schematic drawing of an operating mechanism of an oxygen reduction electrode when the porosity of a catalyst layer is maintained. Referring to FIG. 1, when the porosity of a catalyst layer is maintained, oxygen supplied in a gaseous state can penetrate deeply into the catalyst layer. Accordingly, oxygen is enabled to sufficiently contact the catalyst layer, thus increasing the solubility of oxygen. However, as shown in FIG. 2, when porosity of a catalyst layer is blocked by an electrolyte, flooding is generated. Accordingly, oxygen cannot penetrate into the catalyst layer, thus decreasing the solubility of oxygen. Thus, low oxygen concentration has adverse effects on the performance of a cell.

SUMMARY OF THE INVENTION

In one embodiment, the present invention provides an oxygen reduction electrode which can improve catalyst efficiency by increasing oxygen concentration and easily forming a triple phase boundary.

Another embodiment of the present invention also provides a fuel cell including the oxygen reduction electrode described above.

According to an embodiment of the present invention, an oxygen reduction electrode is provided including: a current collector; a gas diffusion layer; and a catalyst layer including carbon impregnated with at least one kind of catalyst, wherein the catalyst layer further includes at least one kind of metalloporphyrin derivative represented by Formula 1 below:

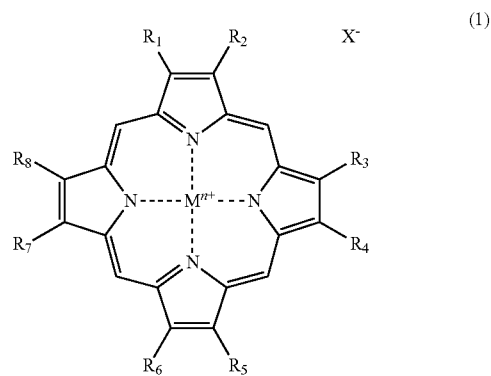

wherein, each of $R_1$, $R_3$, $R_5$, and $R_7$ is independently a $C_{1-20}$ alkyl group; each of $R_2$, $R_4$, $R_6$, and $R_8$ is independently a $C_{2-20}$ carboxylalkyl group or a $C_{1-20}$ alkylene group, where at least one of $R_2$, $R_4$, $R_6$, and $R_8$ is a $C_{2-20}$ carboxylalkyl group and at least one of $R_2$, $R_4$, $R_6$, and $R_8$ is a $C_{1-20}$ alkylene group; M is Fe, Co, Ni, Zn, Sn, or Cu; X— is a halogen anion; and n is 2, 3, or 4.

In another embodiment, each of $R_1$, $R_3$, $R_5$, and $R_7$ of the metalloporphyrin derivative represented by Formula 1 is independently a $C_{2-20}$ carboxylalkyl group or a $C_{1-20}$ alkylene group, where at least two of $R_1$, $R_3$, $R_5$, and $R_7$ are $C_{2-20}$ carboxylalkyl groups and at least two of $R_1$, $R_3$, $R_5$, and $R_7$ are $C_{1-20}$ alkylene groups.

In an embodiment, the metalloporphyrin derivative may be a chemical compound represented by Formula 2 below:

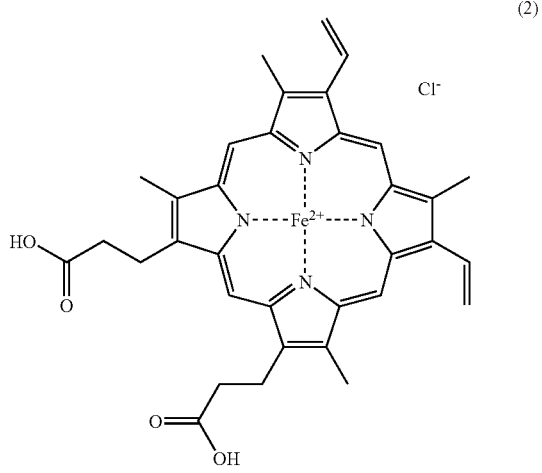

(2)

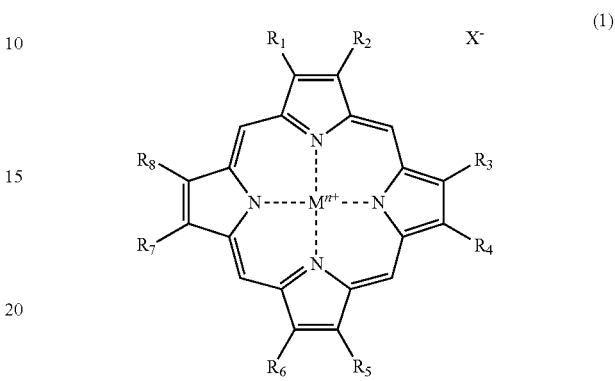

(1)

In one embodiment, the amount of the metalloporphyrin derivative may be in the range of 0.5 to 50 parts by weight based on 100 parts by weight of the catalyst impregnated in the carbon.

In another embodiment, the metalloporphyrin may be introduced into the carbon impregnated with the catalyst using a spray method, a fusing method, an impregnating method, a blending method, or a coating method.

In a further embodiment, the catalyst may be is formed of one of iron, manganese, cobalt, chrome, gallium, vanadium, tungsten, ruthenium, iridium, palladium, platinum, rhodium, nickel, tin, zinc, titanium, tantalum, and an alloy thereof.

According to another embodiment of the present invention, a fuel cell is provided including the oxygen reduction electrode described above.

BRIEF DESCRIPTION OF THE DRAWINGS

The above and other features and advantages of the present invention will become more apparent by describing in detail exemplary embodiments thereof with reference to the attached drawings in which:

FIG. 6 is a schematic diagram of a membrane-electrode assembly that may be used in a fuel cell according to an embodiment of the present invention.

DETAILED DESCRIPTION

Figure 1:
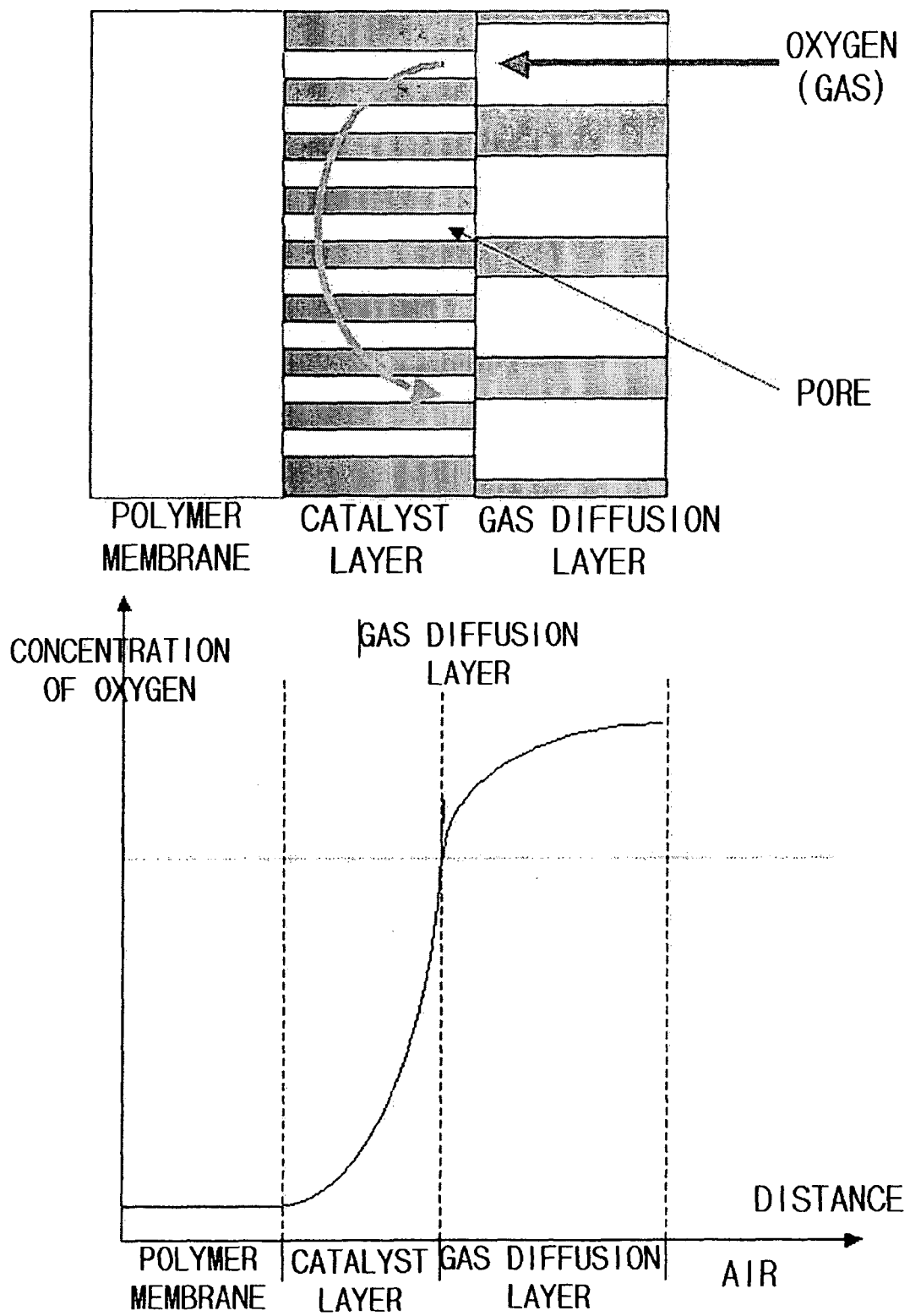
FIG. 1 is a schematic drawing of an operating mechanism of a conventional oxygen reduction electrode when the porosity of a catalyst layer is maintained.
Figure 2:
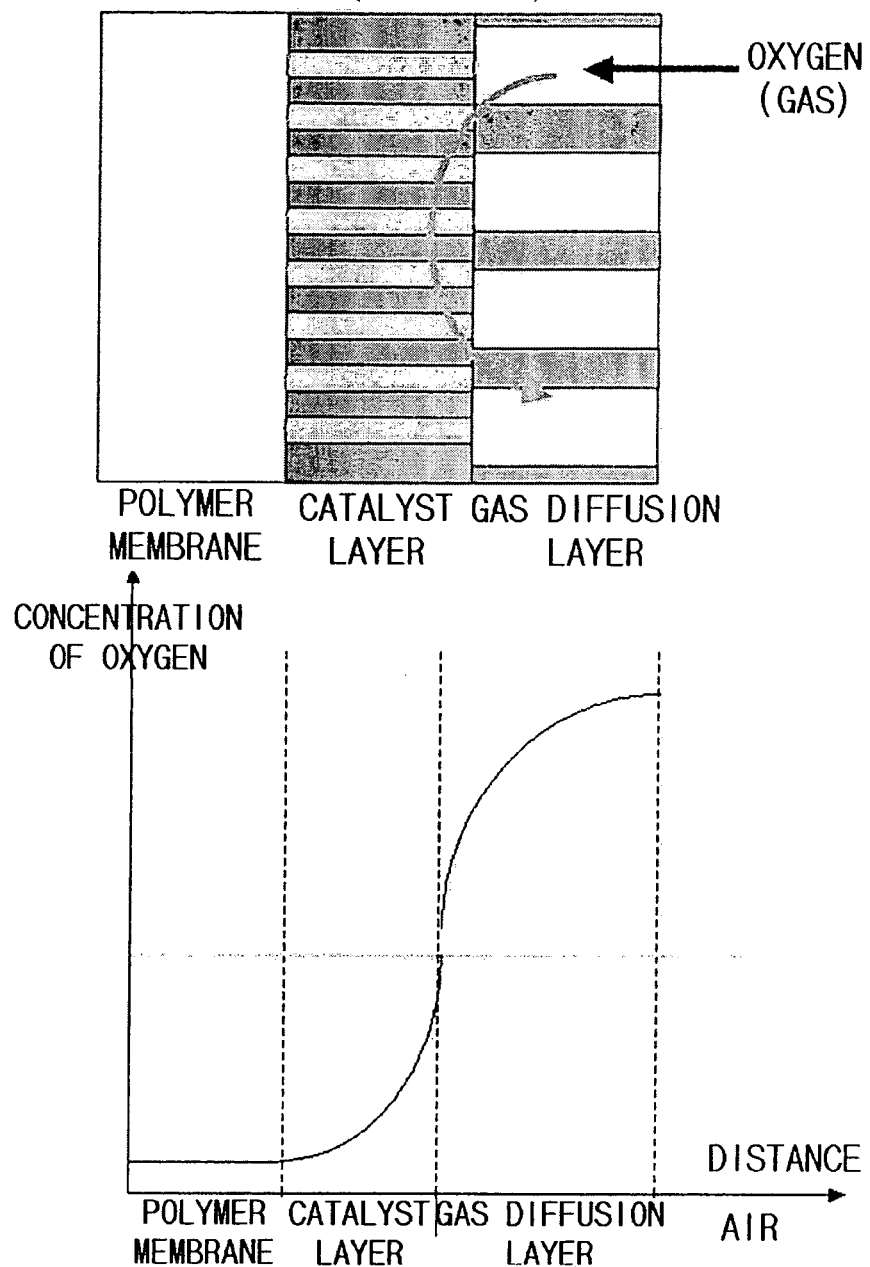
FIG. 2 is a schematic drawing of an operating mechanism of a conventional oxygen reduction electrode when the porosity of a catalyst layer is not maintained.

Hereinafter, the present invention will be described in detail by explaining embodiments of the invention with reference to the attached drawings.

According to an embodiment of the present invention, an oxygen reduction electrode is provided including: a current collector; a gas diffusion layer; and a catalyst layer including carbon impregnated with at least one kind of catalyst, wherein the catalyst layer further includes at least one kind of metalloporphyrin derivative represented by Formula 1 below:

wherein, each of $R_1$, $R_3$, $R_5$, and $R_7$ is independently a $C_{1-20}$ alkyl group; each of $R_2$, $R_4$, $R_6$, and $R_8$ is independently a $C_{2-20}$ carboxylalkyl group or a $C_{1-20}$ alkylene group, where at least one of $R_2$, $R_4$, $R_6$, and $R_8$ is a $C_{2-20}$ carboxylalkyl group and at least one of $R_2$, $R_4$, $R_6$, and $R_8$ is a $C_{1-20}$ alkylene group; M is Fe, Co, Ni, Zn, Sn, or Cu; $X^-$ is a halogen anion; and n is 2, 3, or 4.

In one embodiment, the metalloporphyrin derivative of Formula 1 is introduced to a catalyst particle included in the catalyst layer and the surface of a catalyst carrier to increase hydrophobicity in the chemical atmosphere around the catalyst particle. Accordingly, efficiency deterioration caused by a flooding phenomenon on the catalyst particle can be prevented. At the same time, a path where oxygen flows into the catalyst layer can be easily maintained by increased hydrophobicity. Thus, a triple phase boundary of oxygen (gaseous $O_2$), a proton (liquid $H^+$), and a catalyst (solid) can be easily formed, which can increase catalyst efficiency.

To obtain the above effects, a metalloporphyrin derivative, as a macromolecule, is introduced to a catalyst generally used in a catalyst layer, for example, on the surface of a metal catalyst such as Pt, etc. Accordingly, synergistic effects on oxygen concentration and triple phase boundary formation can be obtained compared to when the catalyst is used alone. This shows that the catalyst and the metalloporphyrin derivative do not independently function each as a catalyst but interact to increase catalyst efficiency.

In one embodiment, the metalloporphyrin derivative and the catalyst can combine chemically and/or physically, and the metalloporphyrin derivative usually exists on the surface of the catalyst.

As shown in Formula 1 above, the metalloporphyrin derivative according to an embodiment of the present invention is a material having various substituents in the α-position, β-position, etc., where metal ions, such as Fe, Co, Ni, Cu, Sn, or Zn are substituted for the center of porphyrine, which is a N4-macrocyclic chemical compound. In one embodiment, at least one kind of metalloporphyrin derivative having such a form can be used in the catalyst layer, preferably one to three kinds, and more preferably one or two kinds.

In one embodiment, the metalloporphyrin derivative of Formula 1 has substituents in the α- and β-positions, and each of $R_2$, $R_4$, $R_6$ and $R_8$ may be independently a $C_{2-20}$ carboxylalkyl group or a $C_{2-20}$ alkylene group. In another embodiment, at least two of $R_2$, $R_4$, $R_6$ and $R_8$ may be independently $C_{2-20}$ carboxylalkyl groups or $C_{2-20}$ alkylene groups. In a further embodiment, the alkylene group may have a double bond at its end.

In one embodiment, the metalloporphyrin derivative of Formula 1 may be a compound represented by Formula 2 below, that is, a hemin compound.

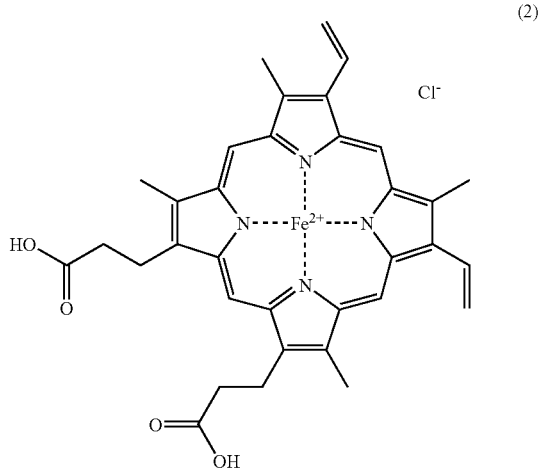

(2)

Figure 3:
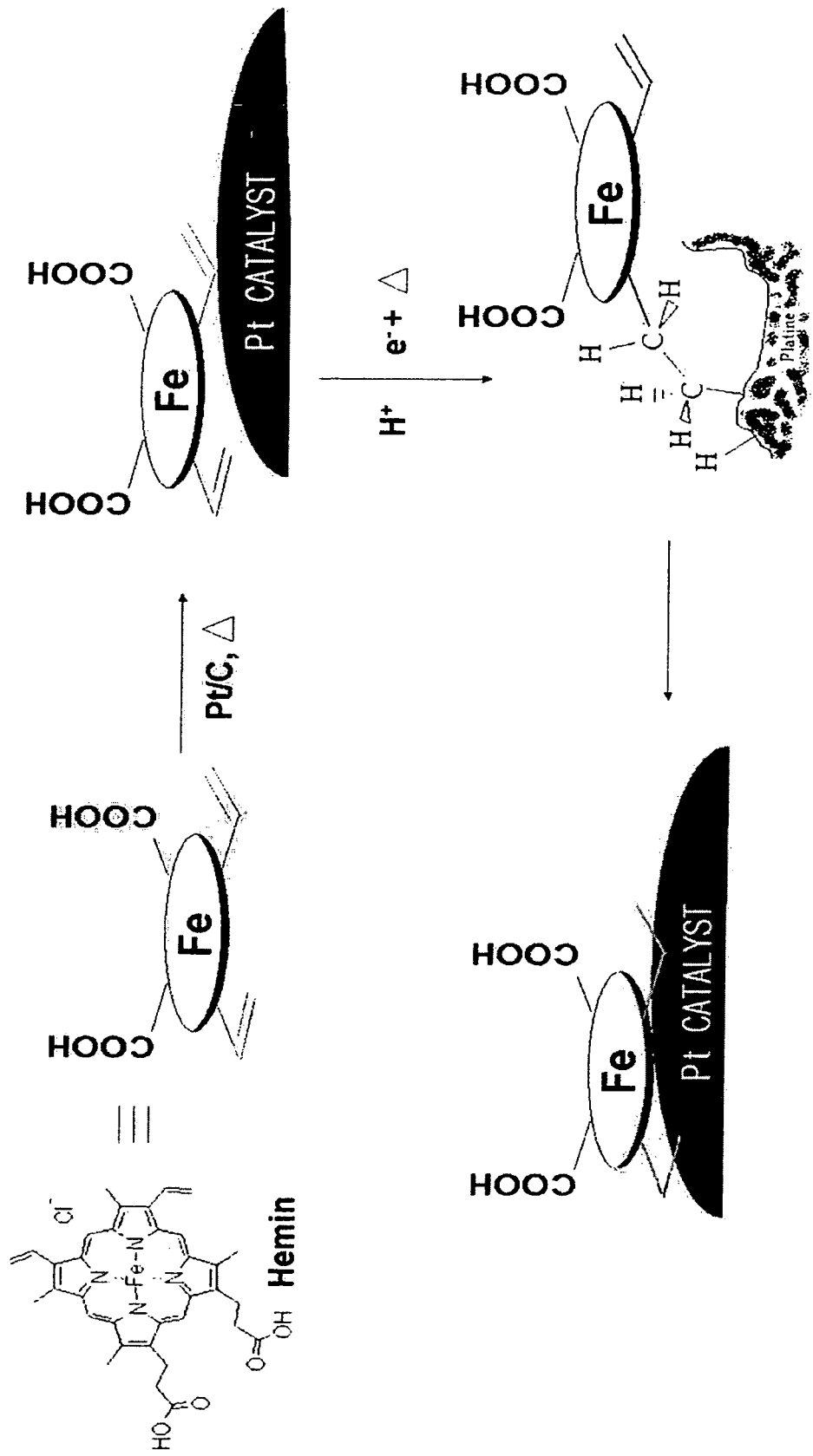
FIG. 3 is a schematic drawing of a reaction of a metalloporphyrin derivative according to an embodiment of the present invention and the surface of a catalyst.

As the hemin compound of Formula 2, when a substituent having a double bond and a terminal carboxyl group is located on a beta-location, the double bond is reduced by a catalyst, such as Pt, reaction as shown in FIG. 3, thus enabling the hemin compound to bind chemically to the surface of the catalyst. The combined hemin compound increases hydrophobicity in the chemical atmosphere around the catalyst, thus preventing deterioration of efficiency caused by a flooding phenomenon of the catalyst particles. Also, the increased hydrophobicity maintains a path where oxygen flows into the catalyst layer.

As a result, oxygen concentration around the catalyst layer can be maintained at a high level, due to the prevention of flooding in the catalyst layer.

The catalyst layer, including the metalloporphyrin derivative according to one embodiment of the present invention, is formed of carbon impregnated with a catalyst. Such a catalyst is not specifically limited, and any metal which accelerates an oxidation reaction of hydrogen and a reduction reaction of the oxygen can be used. Non-limiting examples include iron, manganese, cobalt, chrome, gallium, vanadium, tungsten, ruthenium, iridium, palladium, platinum, rhodium, nickel, tin, zinc, titanium, tantalum, alloys thereof, etc. An amount of catalyst in a conventional range can be impregnated in carbon, and impregnation methods are not specifically limited.

Carbon used with the catalyst in the catalyst layer can be formed of an intensive porous material having a high surface area, or a conducting carbon material, which are commercially available. Non-limiting examples include carbon black, such as acetyleneblack, activated charcoal, graphite, etc.

In an embodiment, the amount of the metalloporphyrin derivative may be in the range of 0.5 to 50 parts by weight based on 100 parts by weight of the catalyst impregnated in carbon, preferably in the range of 2 to 30 parts by weight. When the amount is less than 0.5 parts by weight, the catalyst performance does not show any improvement. When the amount is greater than 50 parts by weight, the metalloporphyrin derivative induces an increase of resistance inside the catalyst layer. Accordingly, catalyst efficiency deteriorates.

The metalloporphyrin can be introduced into carbon impregnated with the catalyst to form the catalyst layer using various methods. Non-limiting examples include a spray method, a fusing method, an impregnating method, a blending method, a coating method, etc.

The catalyst layer including the metalloporphyrin derivative is formed on the gas diffusion layer or on an ionic conductive polymer membrane. In one embodiment, the thickness of the catalyst layer may be 300 μm or less, and preferably in the range of 20 to 80 μm.

In one embodiment, the gas diffusion layer may be formed of a water repellent fluorine resin. The fluorine resin may have a melting point of 400° C. or less. Non-limiting examples of the water repellent fluorine resin include polytetrafluoroethylene, tetrafluoroethylene-perfluoroalkylvinyl ether copolymer, etc. In an embodiment, the thickness of the gas diffusion layer may be in the range of 1 to 50 μm, and may be formed on the current collector.

The current collector may be formed of any electrically conductive material, and examples include all kinds of metal, carbon materials, etc. Carbon materials may be carbon black, such as acetyleneblack, activated charcoal, graphite, etc. These materials may be used alone or in combination of two or more types. In one embodiment, the thickness of the current collector may be in the range of 50 to 500 μm.

A fuel cell according to another embodiment of the present invention including the above oxygen reduction electrode includes a polymer membrane having proton conductivity and a pair of electrodes, each disposed on the sides of the polymer membrane, wherein the pair of electrodes includes a cathode and an anode. Hydrogen in fuel is electrochemically oxidized in the anode to generate a proton and an electron. The proton is delivered through the polymer membrane to the cathode where oxygen is supplied.

On the other hand, the electron flows into the cathode through an external load connected to the fuel cell. In the cathode, the electron, the proton, and oxygen react to form water.

In one embodiment, referring to FIG. 6, the fuel cell contains a membrane-electrode assembly 10 that includes a polymer electrolyte membrane 11, catalyst layers 12, 12' on both surfaces of the polymer electrolyte membrane 11, and gas diffusion layers 13, 13' disposed on the outside surfaces of the catalyst layers 12, 12'.

The cathode can be the oxygen reduction electrode described above, and the anode may be a general electrode. Thus, the anode is formed of a conductive material, a binder, and a catalyst. The conductive material may be any material that has electric conductivity, such as metal, carbon material, etc. Non-limiting examples of carbon material include carbon black, such as acetylene black, activated charcoal, graphite etc. They may be used alone or in combination of two or more types. Also, the binder may be a proton conductive resin, but other resins such as a water repellent fluorine resin may be used. Such a fluorine resin may have a melting point of 400° C. or lower, and examples include polytetrafluoroethylene, tetrafluoroethylene-perfluoroalkylvinylether copolymer, etc. The catalyst may be formed of any metal that accelerates an oxidation reaction of hydrogen and a reduction reaction of oxygen. Non-limiting examples include iron, manganese, cobalt, chrome, gallium, vanadium, tungsten, ruthenium, iridium, palladium, platinum, rhodium, nickel, tin, zinc, titanium, tantalum, and alloys thereof, etc.

The present invention will be described in greater detail with reference to the following examples. The following examples are for illustrative purposes only and are not intended to limit the scope of the invention.

Example 1

1.0 g of Pt/C catalyst, where the amount of platinum was 50 wt % based on the amount of the catalyst, was sufficiently soaked in 8 ml of water. Then 80 ml of isoprophyl alcohol was added to the catalyst to be dispersed for 5 minutes while exposed to ultrasonic waves. Accordingly, catalyst dispersion was obtained. 200 mg of hemin compound of Formula 2 below (manufactured by Frontier Scientific Inc, under the name of Hemin Ferriprotoporphyrin IX chloride) was injected into the catalyst dispersion in a 2/5 weight ratio of the platinum catalyst. The mixture was slowly stirred for 2 hours at 200 RPM at room temperature and then again for 2 hours at 500 RPM at room temperature to prepare a mixture for forming a catalyst layer. The mixture for forming a catalyst layer was mixed with 14 ml of a Polyvinylidene fluoride/N-methyl-2-pyrrolidone (PVdF/NMP) solution, where 1 g of PVdF and 100 ml of NMP were dissolved. The resultant was stirred for at least 6 hours at 500 RPM at room temperature to prepare a slurry. Subsequently, the slurry was coated on a carbon supporter (a current collector). The product was dried at 80° C. for 1 hour, then 120° C. for 30 minutes, and then 150° C. for 10 minutes to prepare an oxygen reduction electrode.

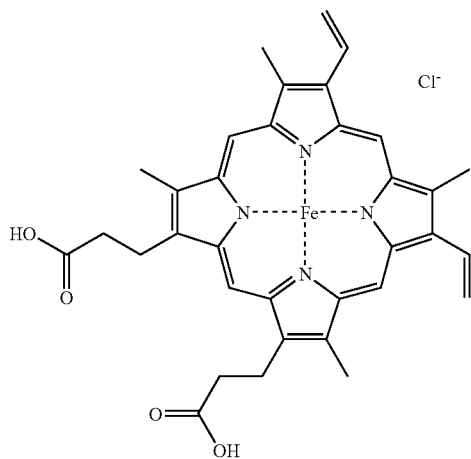

(2)

Example 2

An oxygen reduction electrode was prepared according to Example 1, except that 2.0 g of Pt/C catalyst was used instead of 1.0 g, where the amount of platinum was 50 wt % based on the amount of the catalyst.

Example 3

An oxygen reduction electrode was prepared according to Example 1, except that 3.0 g of Pt/C catalyst was used instead of 1.0 g, where the amount of platinum was 50 wt % based on the amount of the catalyst.

Comparative Example 1

An oxygen reduction electrode was prepared according to Example 1, except that the hemin compound of Formula 2 was not used.

Comparative Example 2

An oxygen reduction electrode was prepared according to Example 2, except that the hemin compound of Formula 2 was not used.

Comparative Example 3

An oxygen reduction electrode was prepared according to Example 3, except that the hemin compound of Formula 2 was not used.

Comparative Example 4

An oxygen reduction electrode was prepared according to Example 1, except that tetraphenylporphyrinic of Formula 3 (manufactured by porphyrin Systems under the name of 5,10,15,20-Tetrakis-(2,3,4,5,6-pentafluoro-phenyl)-porphyrin-Fe (III) chloride) was used instead of the hemin compound of Formula 2.

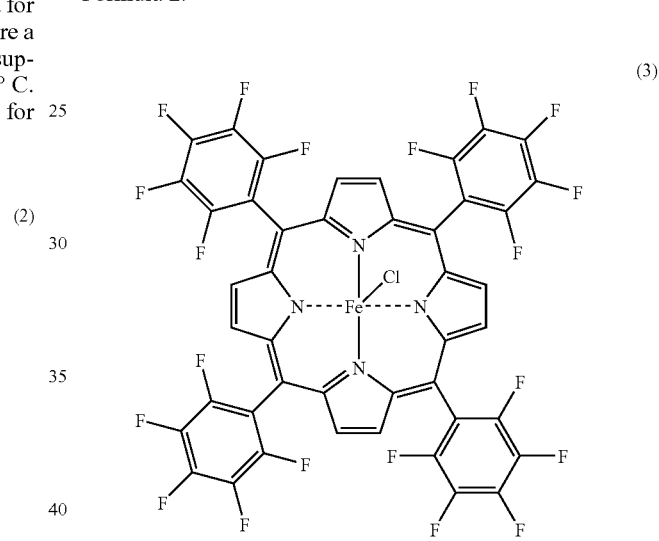

(3)

Experiment Example 1

A fuel cell including the oxygen reduction electrode of any one of Examples 1 through 3 and Comparative Examples 1 through 3 was prepared using a conventional method. Current increments of these fuel cells were measured, and the results are shown in FIG. 4.

Figure 4:
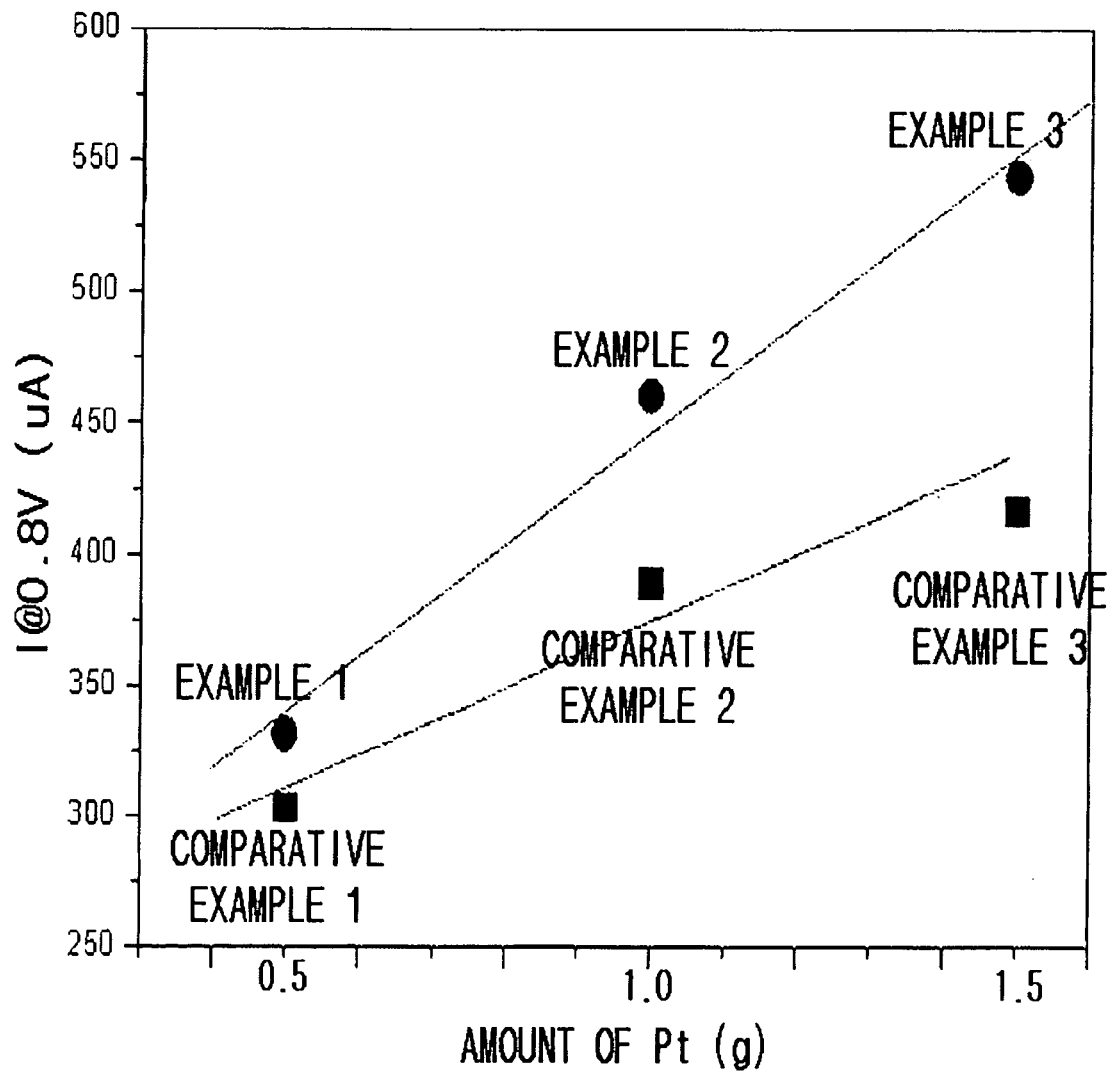
FIG. 4 is a graph illustrating a current value of fuel cells including oxygen reduction electrodes obtained in Examples 1 to 3 and Comparative Examples 1 to 3 according to embodiments of the present invention.

As shown in FIG. 4, a fuel cell including the oxygen reduction electrode of any one of Examples 1 through 3, where the hemin compound of Formula 2, which is a metalloporphyrin derivative according to an embodiment of the present invention, is used as an additive with platinum, which is a main catalyst, had higher increments as the amount of platinum increased, compared to a fuel cell including the oxygen reduction of any one of Comparative Examples 1 through 3. Such results show that the hemin compound of Formula 2 and platinum do not function independently as oxygen reductants, but interact to have a synergestic effect on a fuel cell.

Experiment Example 2

Figure 5:
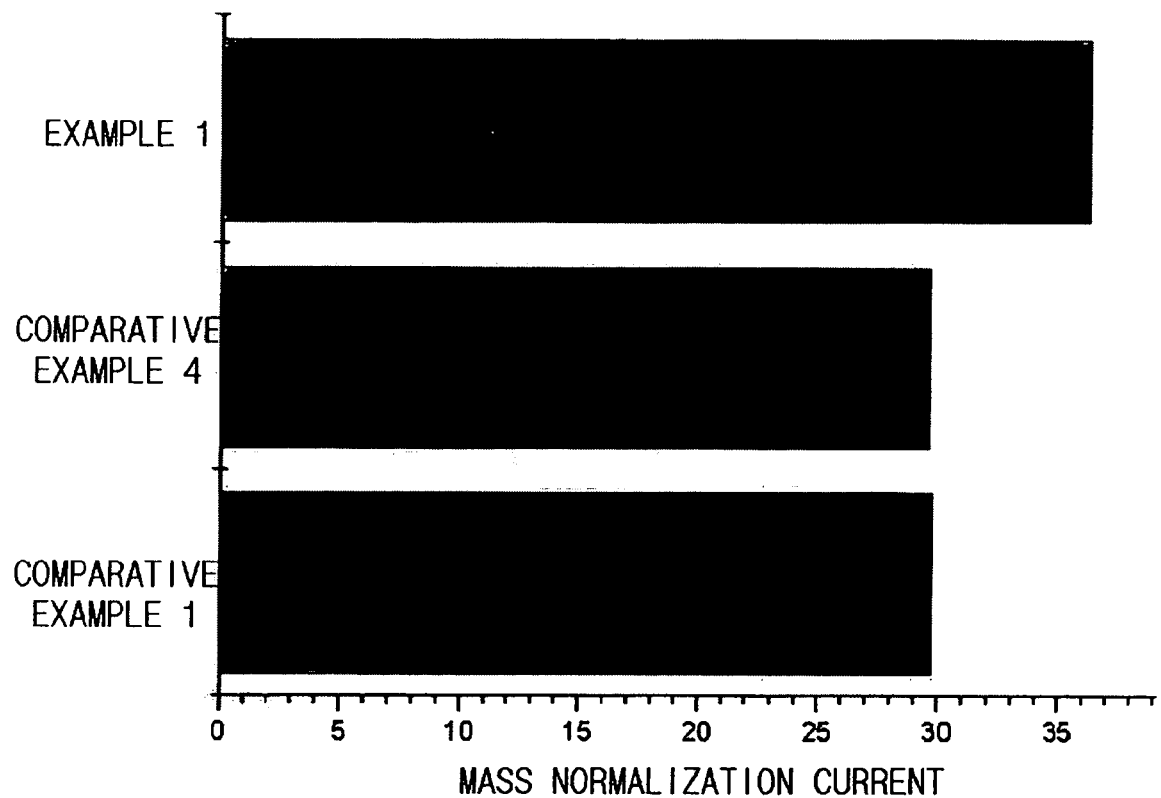
FIG. 5 is a graph illustrating mass normalized current of fuel cells obtained in Example 1, Comparative Examples 1 and 4 according to embodiments of the present invention.

A fuel cell including the oxygen reduction electrode of any one of Example 1 and Comparative Examples 1 through 4 was prepared using a conventional method. Current of these fuel cells was measured, and the results are shown in FIG. 5. In FIG. 5, current was measured at 0.8V vs. RHE (reference hydrogen electrode) and was mass normalized.

As shown in FIG. 5, when the hemin compound of Formula 2 was used as in Example 1, the fuel cell had about a 20% higher current than Comparative Examples 1 and 4 which used a general porphyrin compound.

The catalyst layer of the oxygen reduction electrode according to the present invention uses a metalloporphyrin derivative as an additive to maintain porosity of the catalyst layer.

Accordingly, an oxygen reduction electrode is provided which can improve catalyst efficiency by increasing oxygen concentration and easily forming a triple phase boundary by reducing a flooding phenomenon caused by an electrolyte. Also, a fuel cell can have an improved performance by including such an oxygen reduction electrode.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. An oxygen reduction electrode comprising:
   a current collector;
   a gas diffusion layer; and
   a catalyst layer consisting of:
      polyvinylidene fluoride,
      carbon impregnated with a metal catalyst, and
      at least one metalloporphyrin derivative represented by Formula 1 below, the at least one metalloporphyrin derivative being bound chemically to the surface of the metal catalyst:

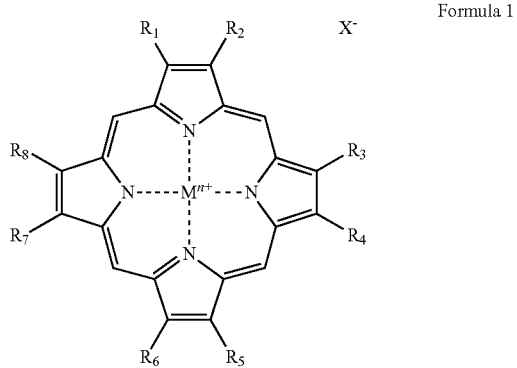

Formula 1 wherein, each of $R_1$, $R_3$, $R_5$, and $R_7$ is independently a $C_{1-20}$ alkyl group; each of $R_2$, $R_4$, $R_6$, and $R_8$ is independently a $C_{2-20}$ carboxylalkyl group or a $C_{1-20}$ alkylene group, where at least one of $R_2$, $R_4$, $R_6$, and $R_8$ is a $C_{2-20}$ carboxylalkyl group and at least one of $R_2$, $R_4$, $R_6$, and $R_8$ is a $C_{1-20}$ alkylene group; M is Fe, Co, Ni, Zn, Sn, or Cu; $X^-$ is a halogen anion; and n is 2, 3, or 4.

2. The oxygen reduction electrode of claim 1, wherein at least two of $R_2$, $R_4$, $R_6$, and $R_8$ are $C_{2-20}$ carboxylalkyl groups, or at least two of $R_2$, $R_4$, $R_6$, and $R_8$ are $C_{1-20}$ alkylene groups.

3. The oxygen reduction electrode of claim 1, wherein the metalloporphyrin derivative is a chemical compound represented by Formula 2 below:

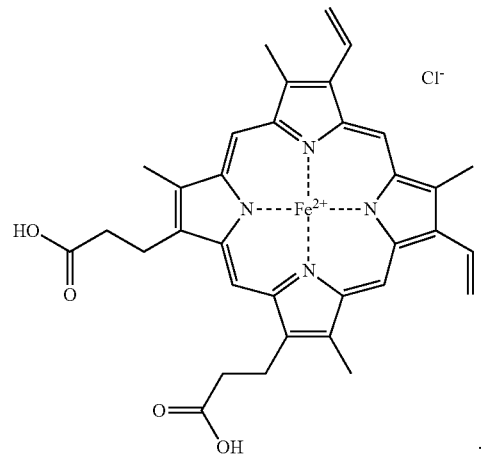

Formula 2

4. The oxygen reduction electrode of claim 1, wherein the amount of the metalloporphyrin derivative is in the range of 0.5 to 50 parts by weight based on 100 parts by weight of the metal catalyst impregnated in the carbon.

5. The oxygen reduction electrode of claim 1, wherein the metalloporphyrin is introduced into the carbon impregnated with the catalyst using a spray method, a fusing method, an impregnating method, a blending method, or a coating method.

6. The oxygen reduction electrode of claim 1, wherein the metal catalyst comprises a material selected from the group consisting of iron, manganese, cobalt, chrome, gallium, vanadium, tungsten, ruthenium, iridium, palladium, platinum, rhodium, nickel, tin, zinc, titanium, tantalum, and alloys thereof.

7. A fuel cell comprising the oxygen reduction electrode of claim 1.

8. A fuel cell comprising the oxygen reduction electrode of claim 2.

9. A fuel cell comprising the oxygen reduction electrode of claim 3.

10. A fuel cell comprising the oxygen reduction electrode of claim 4.

11. A fuel cell comprising the oxygen reduction electrode of claim 5.

12. A fuel cell comprising the oxygen reduction electrode of claim 6.

* * * * *